(12) United States Patent
Kim

(10) Patent No.: US 12,483,466 B2
(45) Date of Patent: Nov. 25, 2025

(54) BI-DIRECTIONAL CONTROLLER AREA NETWORK COMMUNICATION SYSTEM OF MULTIPLE DEVICES

(71) Applicant: SAMSUNG SDI CO., LTD., Yongin-si (KR)

(72) Inventor: Hyungho Kim, Yongin-si (KR)

(73) Assignee: SAMSUNG SDI CO., LTD., Yongin-si (KR)

( * ) Notice: Subject to any disclaimer, the term of this patent is extended or adjusted under 35 U.S.C. 154(b) by 28 days.

(21) Appl. No.: 18/410,201

(22) Filed: Jan. 11, 2024

(65) Prior Publication Data

US 2025/0088411 A1    Mar. 13, 2025

(30) Foreign Application Priority Data

Sep. 8, 2023   (KR) ........................ 10-2023-0119612

(51) Int. Cl.
*H04L 41/0659* (2022.01)
*G06F 11/20* (2006.01)
(Continued)

(52) U.S. Cl.
CPC ...... *H04L 41/0659* (2013.01); *G06F 11/2002* (2013.01); *G06F 13/4022* (2013.01); *G06F 13/4068* (2013.01); *H04L 12/40091* (2013.01)

(58) Field of Classification Search
CPC ........... H04L 41/0659; H04L 12/40091; G06F 11/2002
See application file for complete search history.

(56) References Cited

U.S. PATENT DOCUMENTS 5,914,957 A    6/1999   Dean et al.
10,498,004 B1 * 12/2019   Ji ............................ H01P 5/18
(Continued)

FOREIGN PATENT DOCUMENTS

KR   10-2266785 B1    6/2021
KR   10-2454755 B1   10/2022
(Continued)

OTHER PUBLICATIONS

Extended European Search Report dated Oct. 28, 2024, for corresponding EP Patent Application No. 24173268.4.

*Primary Examiner* — Henry Tsai
*Assistant Examiner* — Aurangzeb Hassan
(74) *Attorney, Agent, or Firm* — Lee IP Law, P.C.

(57) ABSTRACT

A communication system for sub-devices from a first sub-device to an $n^{th}$ sub-device, which are connected to a main device through a communication line, includes a switch provided at each of both ends of the main device and the plurality of sub-devices to open and close the communication line, a termination resistor and a termination switch provided at each of both ends of the main device and the sub-devices to form one termination end of the communication line when the switch is opened, a first communication line sequentially connecting the main device to each of the sub-devices from the first sub-device to the $n^{th}$ sub-device, a second communication line directly connecting one end of the main device to one end of the $n^{th}$ sub-device, and a processor electrically connected to the switch and the termination switch to control opening/closing operations of the switch and the termination switch.

16 Claims, 6 Drawing Sheets

(51) Int. Cl.
*G06F 13/40* (2006.01)
*H04L 12/40* (2006.01)

(56) References Cited

U.S. PATENT DOCUMENTS

| | | | |
|---|---|---|---|
| 2008/0315914 A1* | 12/2008 | Nam | H04L 25/0278 |
| | | | 326/30 |
| 2011/0298559 A1* | 12/2011 | Kitching | H04B 1/40 |
| | | | 333/112 |
| 2013/0149912 A1* | 6/2013 | Oberski | H04L 41/04 |
| | | | 439/676 |
| 2014/0226459 A1 | 8/2014 | Edmiston | |
| 2015/0102943 A1* | 4/2015 | de Greef | B60L 58/21 |
| | | | 324/426 |
| 2017/0070821 A1* | 3/2017 | Arknaes-Pedersen | |
| | | | H04R 29/007 |
| 2017/0264459 A1 | 9/2017 | Cho | |
| 2022/0271972 A1* | 8/2022 | Dekker | H04L 12/40091 |

FOREIGN PATENT DOCUMENTS

| | | |
|---|---|---|
| KR | 10-2517490 B1 | 4/2023 |
| WO | WO 2022/176370 A1 | 8/2022 |

\* cited by examiner

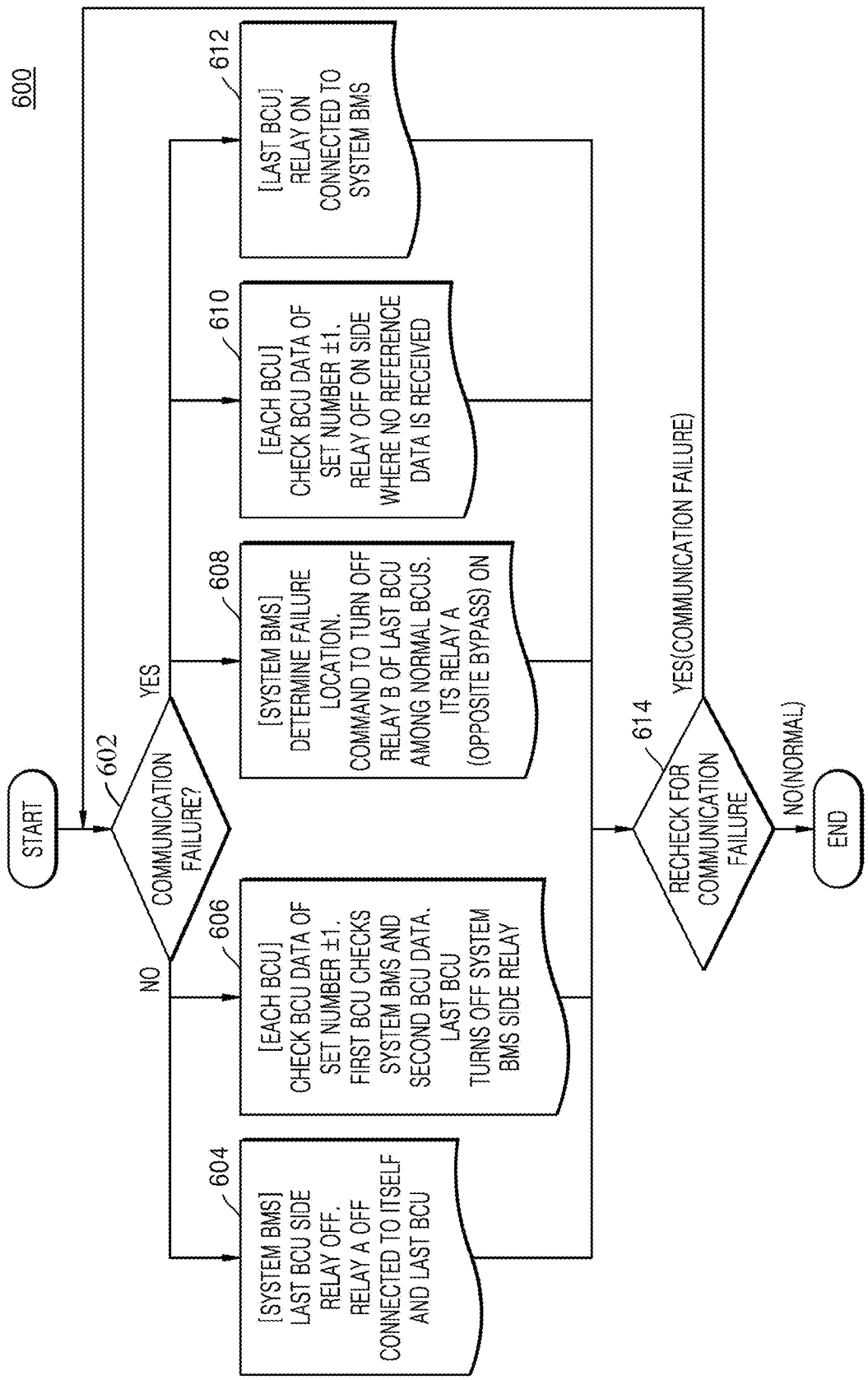

BI-DIRECTIONAL CONTROLLER AREA NETWORK COMMUNICATION SYSTEM OF MULTIPLE DEVICES

CROSS-REFERENCE TO RELATED APPLICATION

This application is based on and claims priority under 35 U.S.C. § 119 to Korean Patent Application No. 10-2023-0119612, filed on Sep. 8, 2023, in the Korean Intellectual Property Office, the disclosure of which is incorporated by reference herein in its entirety.

BACKGROUND

1. Field

One or more embodiments relate to a bi-directional controller area network (CAN) communication system of multiple devices.

2. Description of the Related Art

In a network structure where multiple devices communicate with each other, a communication ID is set for each device to configure a communication system. For example, in a communication structure where a plurality of devices are connected in a 1:N (multiple) manner, a main device sets communication IDs for a plurality of sub-devices in order to communicate with the plurality of sub-devices. For example, in an energy storage system (ESS) including a plurality of battery racks, a system battery management system (BMS) that is a main device communicates with a plurality of battery control units (BCUs) which are sub-devices.

In a current ESS product line, a controller area network (CAN) is used for communication between a BMS and a plurality of BCUs. CAN communication is established as a standard and is widely used in other applications. However, in a physical configuration method of CAN communication, there are many structures in which communication is impossible beyond when a communication component such as a node (BCU) or a cable is dropped.

SUMMARY

Embodiments, in a first aspect, are directed to a communication system for a plurality of sub-devices from a first sub-device to an $n^{th}$ sub-device, which may be connected to a main device through a communication line, the communication system may include: a switch provided at each of both ends of the main device and the plurality of sub-devices to open and close the communication line; a termination resistor and a termination switch provided at each of both ends of the main device and the plurality of sub-devices to form one termination end of the communication line when the switch is opened; a first communication line sequentially connecting the main device to each of the plurality of sub-devices from the first sub-device to the nth sub-device; a second communication line directly connecting one end of the main device to one end of the nth sub-device; and a processor electrically connected to the switch and the termination switch and configured to control opening/closing (i.e., opening and closing) operations of the switch and the termination switch.

The communication system of the first aspect, wherein the first communication line may directly connect the other end of the main device to one end of the first sub-device, and may directly connect the other end of the first sub-device to one end of the second sub-device.

The communication system of the first aspect, wherein the processor may be further configured to, in a normal communication state with no failure in the communication line, open a switch provided at the one end of the main device connected to the nth sub-device through the second communication line, and close a termination switch provided at the one end of the main device. The communication system of the first aspect, wherein the processor may be further configured to, in a normal communication state with no failure in the communication line, open a switch provided at one end of the nth sub-device connected to the main device through the second communication line, and close a termination switch provided at one end of the nth sub-device.

The communication system of the first aspect, wherein the processor may be further configured to, in a communication failure state with a failure in the communication line, open a switch at one end connected to a (k+1)th sub-device, provided in a kth sub-device that is a last sub-device sequentially from the main device from among sub-devices in a normal communication state, and close a termination switch at one end connected to the (k+1)th sub-device, provided in the kth sub-device. The communication system of the first aspect, wherein the processor further may be further configured to, in the communication failure state with the failure in the communication line, close a switch provided at the one end of the main device connected to the nth sub-device through the second communication line and open a termination switch provided at the one end of the main device. The communication system of the first aspect, wherein the processor may be further configured to, in the communication failure state with the failure in the communication line, close a switch provided at one end of the nth sub-device connected to the main device through the second communication line and open a termination switch provided at one end of the nth sub-device.

The communication system of the first aspect, wherein the processor may be further configured to, in the communication failure state with the failure in the communication line, based on data not being received from the kth sub-device to the $(k+1)^{th}$ sub-device, open a switch at one end connected to the kth sub-device, provided in the $(k+1)^{th}$ sub-device, and close a termination switch at one end connected to the kth sub-device, provided in the $(k+1)^{th}$ sub-device.

Embodiments, in a second aspect, are directed to a method of communication for a plurality of sub-devices from a first sub-device to an nth sub-device, which may be connected to a main device through a communication line, the method may include: providing a communication system, the communication system including a switch at each of both ends of the main device and the plurality of sub-devices; opening and closing a first communication line between the main device and the plurality of sub-devices using the communication system; forming one termination end of the first communication line by opening the switch, wherein the communication system further comprises, at each of both ends of the main device and the plurality of sub-devices, a termination resistor and a termination switch; sequentially connecting the main device to each of the plurality of sub-devices to form the first communication line; directly connecting one end of the main device to one end of the nth sub-device to form a second communication line; and controlling, by a processor electrically connected to the switch and the termination switch, opening and closing operations of the switch and the termination switch.

The method of the second aspect, wherein the sequentially connecting may include directly connecting the other end of the main device to one end of the first sub-device, and directly connecting the other end of the first sub-device to one end of the second sub-device.

The method of communication of the second aspect, wherein, in a normal communication state with no failure in the communication line, opening, by the processor, a switch provided at the one end of the main device connected to the nth sub-device through the second communication line, and closing, by the processor, a termination switch provided at the one end of the main device. The method of communication of the second aspect, wherein, in a normal communication state with no failure in the communication line, opening, by the processor, a switch provided at one end of the nth sub-device connected to the main device through the second communication line, and closing, by the processor, a termination switch provided at one end of the nth sub-device.

The method of communication of the second aspect, wherein, in a communication failure state with a failure in the communication line, opening, by the processor, a switch at one end connected to a (k+1)th sub-device, provided in a kth sub-device that is a last sub-device sequentially from the main device from among sub-devices in a normal communication state, and closing, by the processor, a termination switch at one end connected to the (k+1)th sub-device, provided in the kth sub-device. The method of communication of the second aspect, wherein, in the communication failure state with the failure in the communication line, closing, by the processor, a switch provided at the one end of the main device connected to the nth sub-device through the second communication line and opening, by the processor, a termination switch provided at the one end of the main device. The method of communication of the second aspect, wherein, in the communication failure state with the failure in the communication line, closing, by the processor, a switch provided at one end of the nth sub-device connected to the main device through the second communication line and opening, by the processor, a termination switch provided at one end of the nth sub-device. The method of communication of the second aspect, wherein, in the communication failure state with the failure in the communication line, based on data not being received by the $(k+1)^{th}$ sub-device from the $k^{th}$ sub-device, opening, by the processor, a switch at one end connected to the kth sub-device, provided in the $(k+1)^{th}$ sub-device, and closing, by the processor, a termination switch at one end connected to the $k^{th}$ sub-device, provided in the $(k+1)^{th}$ sub-device.

BRIEF DESCRIPTION OF THE DRAWINGS

Features will become apparent to those of skill in the art by describing in detail exemplary embodiments with reference to the attached drawings in which:

FIG. 6 is a flow diagram describing a communication method of a communication system, according to embodiments of the present disclosure.

DETAILED DESCRIPTION

Figure 1:
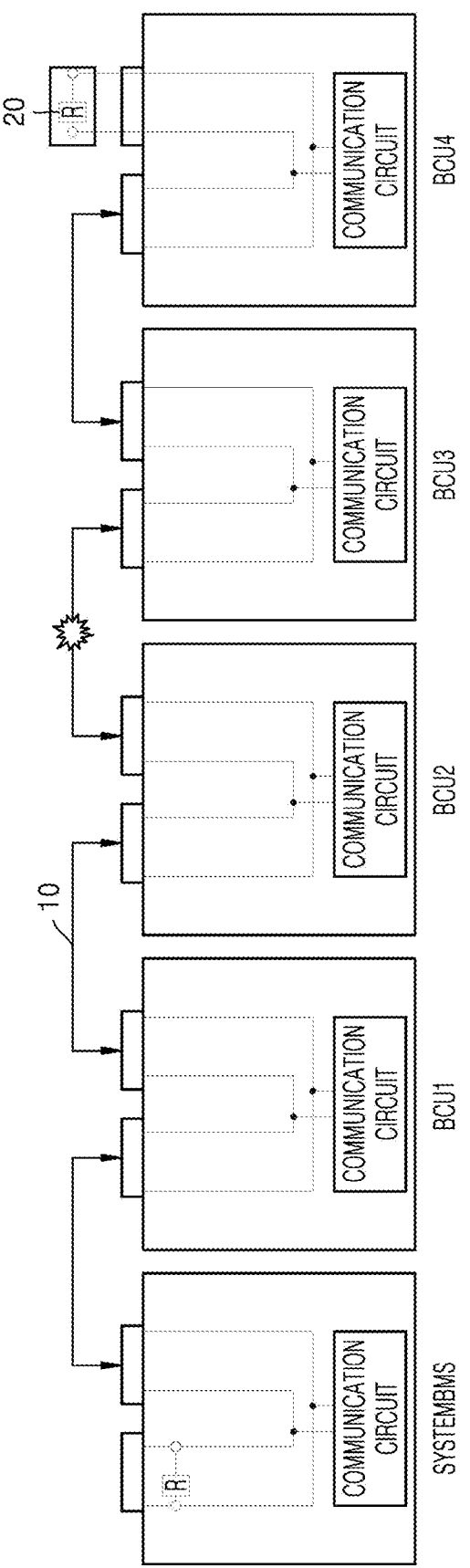
FIG. 1 is a view schematically illustrating elements of a conventional communication system.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. It will also be understood that when a layer or element is referred to as being "on" another layer or substrate, it can be directly on the other layer or substrate, or intervening layers may also be present. Further, it will be understood that when a layer is referred to as being "under" another layer, it can be directly under, and one or more intervening layers may also be present. In addition, it will also be understood that when a layer is referred to as being "between" two layers, it can be the only layer between the two layers, or one or more intervening layers may also be present. Like reference numerals refer to like elements throughout.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are described below, by referring to the figures, to explain aspects of the present description. As used herein, the term "and/or" includes any and all combinations of one or more of the associated listed items. Expressions such as "at least one of," when preceding a list of elements, refer to the entire list of elements and not the individual elements of the list.

Hereinafter, various embodiments will be described in detail with reference to the accompanying drawings so that one of ordinary skill in the art may easily implement the present disclosure. However, the present disclosure is not limited to the particularly described embodiments and various modifications thereof that may be made. When embodiments are described, a detailed explanation will not be given when it is determined that a detailed explanation of related well-known technology may obscure the point of the present disclosure. In the drawings, the same or similar elements are denoted by the same reference numerals, and a repeated description thereof will not be given.

It will be understood that when an element is referred to as being "connected," the element may be directly connected or may be indirectly connected with intervening elements therebetween. It will be further understood that when a part "includes" or "comprises" an element, unless otherwise defined, the part may further include other elements, not excluding the other elements.

Some embodiments may be described by functional block components and various processing steps. Some or all of functional blocks may be implemented by various numbers of hardware and/or software components for performing certain functions. For example, the functional blocks of the present disclosure may be implemented by one or more microprocessors or by circuit components for a certain function. The functional blocks of the present disclosure may be implemented in various programing or scripting languages. The functional blocks of the present disclosure may be implemented in an algorithm executed by one or more processors. A function performed by a functional block of the present disclosure may be performed by a plurality of functional blocks, or functions performed by a plurality of functional blocks in the present disclosure may be performed by one functional block. In addition, the present disclosure may employ related-art techniques for electronic configuration, signal processing, and/or data processing, etc.

FIG. 1 is a view schematically illustrating components of a conventional communication system.

Referring to FIG. 1, in a conventional controller area network (CAN) communication system, a main device (system BMS) may be connected to a plurality of sub-devices BCU1, BCU2, BCU3, and BCU4 through a communication line 10. For example, referring to FIG. 1, in the conventional communication system, a termination resistor 20 may be provided in the last sub-device BCU4 provided at the end of the communication line 10 and a resistor may be provided in the first device of communication line 10 (here, the system BMS). For example, the plurality of sub-devices BCU1, BCU2, BCU3, and BCU4 may be connected so that a communication line passes through them.

For example, referring to FIG. 1, the conventional CAN system may connect the system BMS and a communication circuit of each BCU with the communication line 10 located outside. Also, the termination resistor 20 of CAN communication may be provided in the system BMS and the BCU4 physically connected at both ends. Because the system BMS is always located at the end, a termination resistor may be mounted inside the system BMS.

When a communication failure occurs in the conventional communication system, all devices connected to a communication network become unable to communicate. For example, referring to FIG. 1, when a communication network failure (e.g., disconnection) occurs between the sub-devices (here, between BCU2 and BCU3), all devices connected to the communication network may have poor communication due to the absence of a termination resistor at the end of the communication line, making normal communication difficult.

In general CAN communication, a communication error does not occur only when termination resistors exist in first and last devices. For reference, when mismatch occurs due to a different impedance of a communication line, a termination resistor functions to prevent reflection of signals which may cause a communication failure due to deterioration or attenuation.

In other words, because a termination resistor is required for a last communication device, a circuit of the termination resistor should be configured at a last end of a communication device in order to flexibly use multiple communication devices. Another problem is that if a physical failure occurs in a communication network while communication devices are normally operating after communication IDs are set, all devices connected to the communication network may have poor communication due to the absence of a termination resistor at the end of a communication line, thereby making normal communication difficult.

Figure 2:
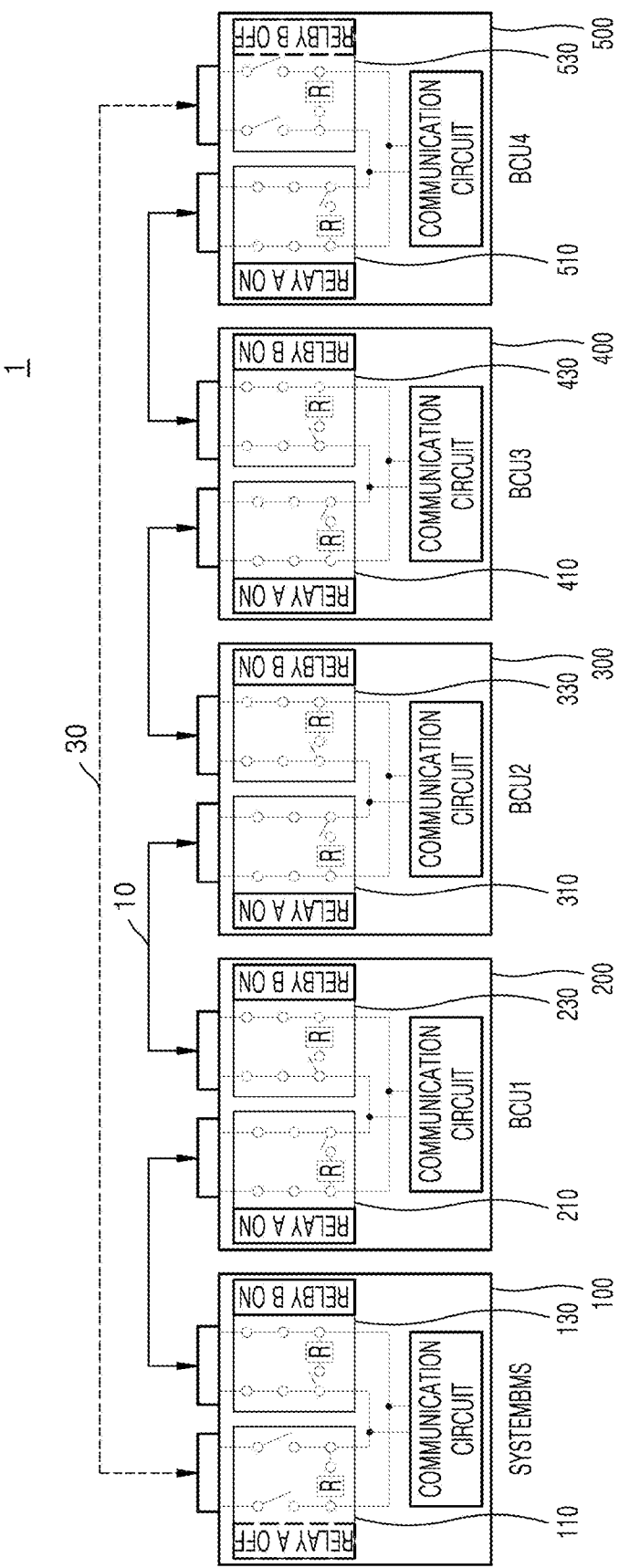
FIG. 2 is a view schematically illustrating elements of a communication system, according to embodiments of the present disclosure.
Figure 3:
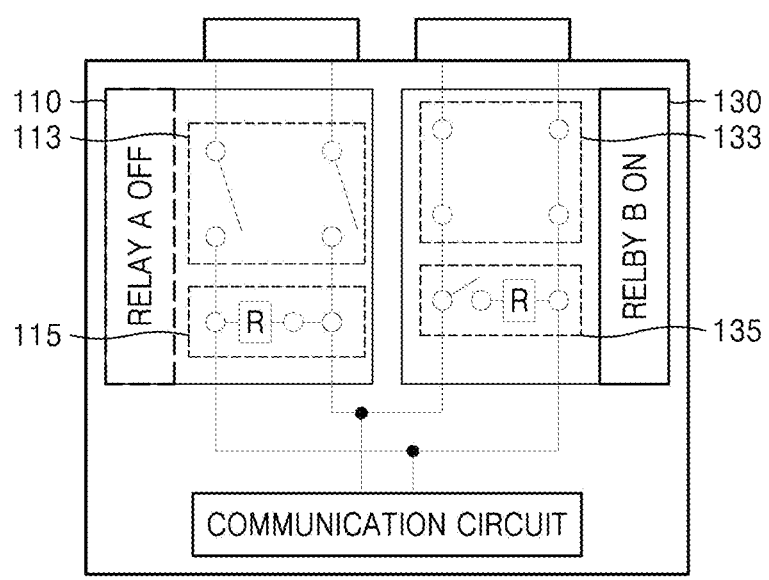
FIGS. 3 and 4 are views schematically illustrating elements of a main device and a sub-device, according to embodiments of the present disclosure.
Figure 4:
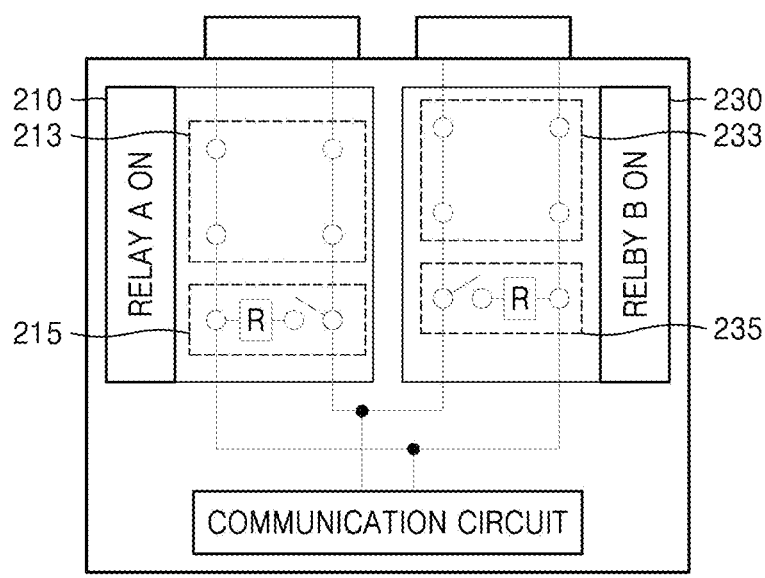

FIG. 2 is a view schematically illustrating components of a communication system, according to embodiments of the present disclosure. Also, FIGS. 3 and 4 are views schematically illustrating components of a main device and a sub-device, according to one or more embodiments of the present disclosure.

First, referring to FIG. 2, a communication system 1 in which a plurality of sub-devices BCU1, BCU2, BCU3, and BCU4 from a first sub-device (BCU1) to a fourth sub-device (BCU4) connected to a main device (system battery management system (BMS)) through a communication network performing CAN communication is illustrated. In the communication system 1 according to one or more embodiments of the present disclosure, the main device (the system BMS) may be connected to the plurality of sub-devices BCU1, BCU2, BCU3, and BCU4 through a communication line. For example, the main device (system BMS) may be connected to the plurality of sub-devices BCU1, BCU2, BCU3, and BCU4 through a first communication line 10 and a second communication line 30.

The first communication line 10 may sequentially connect the main device to each of the plurality of sub-devices from a first sub-device to an $n^{th}$ sub-device. For example, referring to FIG. 2, the first communication line 10 may directly connect the other end of a main device 100 to one end of a first sub-device 200. Also, the first communication line 10 may directly connect the other end of the first sub-device 200 to one end of a second sub-device 300. Also, the first communication line 10 may directly connect the other end of the second sub-device 300 to one end of a third sub-device 400. Also, the first communication line 10 may directly connect the other end of the third sub-device 400 to one end of a fourth sub-device 500.

The second communication line 30 may directly connect one end of the main device to one end of the $n^{th}$ sub-device. For example, referring to FIG. 2, the second communication line 30 may directly connect one end of the main device 100 to one end of the fourth sub-device 500.

The main device and the plurality of sub-devices according to embodiments of the present disclosure may include a switch provided at each of both ends of the main device and the plurality of sub-devices to open and close the communication line. Also, the main device and the plurality of sub-devices according to embodiments of the present disclosure may include a termination resistor and a termination switch provided at each of both ends of the main device and the plurality of devices to form one termination end of the communication line. For example, the main device and the plurality of sub-devices of the present disclosure may include two switches, two termination resistors, and two termination switches.

For example, referring to FIG. 2, the main device 100 may include a first circuit unit 110 at one end. Also, the main device 100 may include a second circuit unit 130 at the other end. Also, the plurality of sub-devices 200, 300, 400, and 500 may include first circuit units 210, 310, 410, and 510 at one end, and may include second circuit units 230, 330, 430, and 530 at the other end.

For example, referring to FIG. 3, the first circuit unit 110 of the main device 100 may include a first switch 113, a termination resistor R, and a termination switch 115. Also, the second circuit unit 130 of the main device 100 may include a second switch 133, a termination resistor R, and a termination switch 135.

For example, referring to FIG. 4, the first circuit unit 210 of the first sub-device 200 may include a first switch 213, a termination resistor, and a termination switch 215. Also, the second circuit unit 230 of the first sub-device 200 may include a second switch 233, a termination resistor, and a termination switch 235.

Each of the main device (system BMS) and the plurality of sub-devices BCU1, BCU2, BCU3, and BCU4 according to embodiments of the present disclosure may include a communication module, a processor, and a memory. For example, see the communication module, the processor and the memory in the main device of FIG. 3.

The processor may control communication of each device. Also, the processor may control an opening/closing operation of the switches. For example, the processor may selectively take the form of a processor, an application-specific integrated circuit (ASIC), another chipset, a logic circuit, a register, a communication modem, and/or a data processing device, known in the art. Also, the processor may perform basic arithmetic, logic, and input/output operations, and may execute, for example, program code stored in the memory. The processor may store data in the memory or load data stored in the memory.

The processor may be electrically connected to the switch and the termination switch. For example, the switch and the termination switch provided in the main device and the plurality of sub-devices may be electrically connected to the processor of each of the main device and the plurality of sub-devices. Also, the processors provided in the main device and the plurality of sub-devices may be electrically connected to each other to transmit and receive data.

Also, the processor may control opening/closing operations of the switch and the termination switch. For example, the processor provided in the main device and the plurality of sub-devices may control opening/closing operations of the switch, e.g., first switch 113, and the termination switch, e.g., termination switch 115, provided in each of the main device and the plurality of sub-devices. Also, the processor provided in the main device may control the processors provided in the plurality of sub-devices.

The processor according to embodiments of the present disclosure may open the switch provided at one end of the main device connected to the $n^{th}$ sub-device through the second communication line and may close the termination switch provided at one end of the main device in a normal communication state with no failure in the communication line. For example, referring to FIGS. 2 and 3, in a normal communication state with no failure in the communication line, the processor may open the switch 113 provided at one end of the main device 100 connected to the fourth sub-device 500 through the second communication line 30. Also, the processor may close the termination switch 115 provided at one end of the main device 100. In this case, the termination resistor may be connected to the communication line.

The processor according to embodiments of the present disclosure may open the switch provided at one end of the $n^{th}$ sub-device connected to the main device through the second communication line and may close the termination switch provided at one end of the $n^{th}$ sub-device in a normal communication state with no failure in the communication line. For example, referring to FIG. 2, in a normal communication state with no failure in the first communication line 10, the processor, e.g., processor 145 in FIG. 3 may open the switch provided at one end of the fourth sub-device 500 connected to the main device 100 through the second communication line 30. Also, the processor may close the termination switch provided at one end of the fourth sub-device 500. In this case, the termination resistor may be connected to the communication line 30.

The memory may be a non-transient processor-readable storage medium and may include, for example, a permanent mass storage device such as a Random Access Memory or RAM, a Read Only Memory or ROM, a disk drive, solid state storage, etc. Stored in the memory may be, for example, an operating system and at least one program or application code. Program code for CAN communication according to embodiments of the present disclosure may be stored in the memory.

Each of the main device and the plurality of sub-devices may further include a communication module, e.g., communication module 140 in FIG. 3. For example, each of the main device and the plurality of sub-devices may transmit and receive data to and from each other by using the communication modules.

A communication method of the communication module is not limited, and may include not only a communication method using a communication network (e.g., a mobile communication network, wired Internet, wireless Internet, or a broadcasting network) that may be included in the network, but also short-range wireless communication between devices. For example, the network may include at least one of a personal area network (PAN), a local area network (LAN), a campus area network (CAN), a metropolitan area network (MAN), a wide area network (WAN), a broadband network (BBN), and the Internet. Also, the network may include, but is not limited to, at least one of network topologies including a bus network, a star network, a ring network, a mesh network, a star-bus network, and a tree or hierarchical network.

Also, the communication system according to the present disclosure may include an input/output interface. The input/output interface may be a means for interfacing with an input/output device. For example, the input device may include a device such as a keyboard or a mouse, and the output device may include a device such as a display for displaying a communication session of an application. In another example, the input/output interface may be a means for interfacing with a device in which input and output functions are integrated into one such as a touchscreen.

Figure 5:
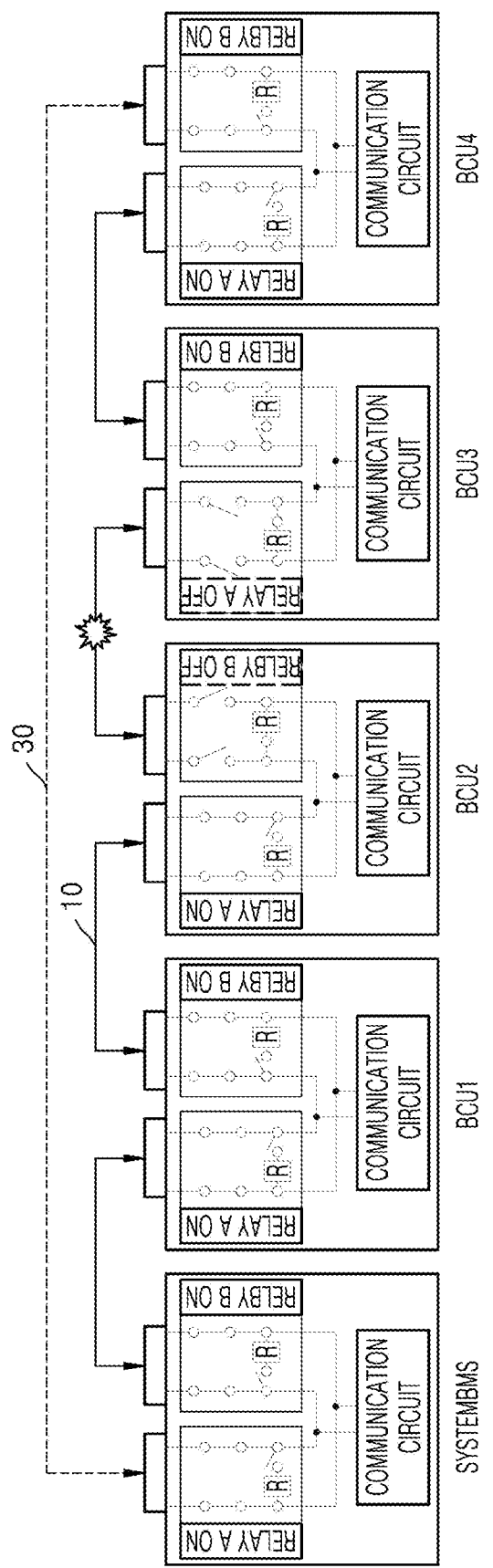
FIG. 5 is a view for describing a bi-directional communication method during a communication failure in a communication system, according to embodiments of the present disclosure.

FIG. 5 is a view for describing a bi-directional communication method during a communication failure in a communication system, according to embodiments of the present disclosure.

Referring to FIG. 5, in a communication system according to embodiments of the present disclosure, a failure (e.g., cable disconnection or drop-out) has occurred in the communication line between the second sub-device BCU2 and the third sub-device BCU3.

The processor may also close the switch provided at one end of the main device connected to the $n^{th}$ sub-device through the second communication line and may open the termination switch provided at one end of the main device in a communication failure state with a failure in a communication line between adjacent sub-devices. For example, referring to FIG. 5, in a communication failure state with a failure in a communication line, e.g., communication line 10, the processor may close (relay ON) the switch provided at one end of the main device (system BMS) connected to the fourth sub-device BCU4 through the second communication line 30 and may open the termination switch, e.g., termination switch 115 in FIG. 3, provided at one end of the main device (system BMS). In this case, the termination resistor connected from one end of the main device to one end of the communication line may be disconnected.

In a communication failure state with a failure in a communication line, the processor may open a switch at one end connected to a $(k+1)^{th}$ sub-device, provided in a $k^{th}$ sub-device that is a last sub-device sequentially from the main device from among sub-devices in a normal communication state. Also, the processor may close a termination switch at one end connected to the $(k+1)^{th}$ sub-device, provided in the $k^{th}$ sub-device. For example, referring to FIG. 5, in a communication failure state with a failure in a communication line, e.g., communication line 10 the processor may open (relay OFF) the switch at one end connected to the third sub-device BCU3, provided that the second sub-device BCU2 is a last sub-device from among the first sub-device and the second sub-device in a normal state from the main device. Also, the processor may close the termination switch (relay OFF) at one end of the second sub-device BCU2 connected to the third sub-device BCU3, provided in the second sub-device BCU2. In this case, the termination resistor may be connected from one end of the second sub-device BCU2 to one end of the communication line.

In a communication failure state with a failure in a communication line, based on the fact that data is not received from a $k^{th}$ sub-device to a $(k+1)^{th}$ sub-device, the processor may open a switch at one end connected to the $k^{th}$ sub-device, provided in the $(k+1)^{th}$ sub-device and may close a termination switch at one end connected to the $k^{th}$ sub-device, provided in the $(k+1)^{th}$ sub-device. For example, referring to FIG. 5, in a communication failure state with a failure in a communication line, based on the fact that data is not received by the third sub-device BCU3 from the second sub-device BCU2, the processor may open (relay OFF) the switch at one end connected to the second sub-device BCU2, provided in the third sub-device BCU3, and may close the termination switch at one end connected to the second sub-device BCU2, provided in the third sub-device BCU3. In this case, the termination resistor may be connected from one end of the third sub-device BCU3 to one end of the communication line.

The processor may close the switch provided at one end of the $n^{th}$ sub-device connected to the main device through the second communication line and may open the termination switch provided at one end of the $n^{th}$ sub-device in a communication failure state with a failure in a communication line. For example, referring to FIG. 5, in a communication failure state with a failure in a communication line, e.g., communication line 10 the processor may close (relay ON) the switch provided at one end of the fourth sub-device BCU4 connected to the main device (system BMS) through the second communication line, e.g., communication line 30 and may open the termination switch provided at one end of the fourth sub-device BCU4. In this case, the termination resistor connected from one end of the fourth sub-device BCU4 to one end of the communication line may be disconnected.

In a communication system according to the present disclosure, even when a communication failure occurs in a middle portion of a communication line, communication is possible due to a termination resistor provided in each sub-device and connection of the termination resistor by a switch.

FIG. 6 is a flow diagram 600 describing a communication method of a communication system, according to embodiments of the present disclosure.

Referring to FIGS. 2, 5, and 6 together, in a communication system according to embodiments of the present disclosure, in a normal communication state ("No" to inquiry 602), the switch at one end of the main device connected to the fourth sub-device that is a last sub-device may be opened, and the termination switch at one end of the main device may be closed, to connect the termination resistor (604, FIG. 6).

Also, in the communication system according to embodiments of the present disclosure, each sub-device BCU in a structure in which the main device and the plurality of sub-devices are sequentially connected may check a communication state by checking transmission/reception data from front and rear devices. For example, referring to FIG. 2, the first sub-device BCU1 may check a communication state by checking transmission/reception data from the main device (system BMS) and the second sub-device BCU2 (606, FIG. 6).

Also, in the communication system according to embodiments of the present disclosure, in a normal communication state, for the fourth sub-device BCU4 that is a last sub-device, the switch at one end of the fourth sub-device BCU4 connected to the main device (system BMS) may be opened and the termination switch at one end of the fourth sub-device BCU4 may be closed, to connect the termination resistor (606, FIG. 6).

In the communication system according to embodiments of the present disclosure, in a communication failure state ("Yes" to inquiry 602), the main device (system BMS) may determine a failure location, and may open a switch at one end of a $k^{th}$ sub-device connected to a $(k+1)^{th}$ sub-device, provided in the $k^{th}$ sub-device that is a last sub-device from among normal sub-devices. In this case, a termination resistor may be connected to a communication line at one end of the $k^{th}$ sub-device (608, 612 FIG. 6).

Also, in the communication system according to embodiments of the present disclosure, in a communication failure state, each sub-device BCU in a structure in which the main device and the plurality of sub-device are sequentially connected may check transmission/reception data from front and rear devices. Each sub-device BCU may open a switch and close a termination switch in a direction in which data is not received to connect a termination resistor (610, FIG. 6). Where there is a communication failure ("Yes" to inquiry 602) after performing steps 608, 610 and 612, the main device may recheck for a communication failure (614, FIG. 6) and if there is a failure, the method returns to inquiry 602.

In the related art, when a failure (e.g., disconnection or short-circuit) occurs in a communication line, all communication devices connected to the communication line may have poor communication. However, according to embodiments of the present disclosure, bi-directional communication is possible because communication lines are separated from front and rear ends based on the communication line failure and a termination resistor is connected.

Various embodiments described above are exemplary and are not necessarily distinguished and independently implemented. The embodiments described herein may be implemented in combination with each other.

The various embodiments described above may be implemented as computer programs executable through various components on a computer, and the computer programs may be stored in a computer-readable medium. In this case, the medium may continuously store the computer-executable programs, or may temporally store the computer-executable programs for execution or downloading. Also, the medium may be any of various recording media or storage media in which a single piece or plurality of pieces of hardware are combined, and the medium is not limited to a medium directly connected to a computer system, but may be distributed on a network. Examples of the medium may include magnetic media such as a hard disk, a floppy disk, and a magnetic tape, optical recording media such as a CD-ROM and a DVD, magneto-optical media such as a floptical disk, and devices configured to store program instructions such as a ROM, a random-access memory (RAM), and a flash memory. Also, other examples of the medium may include recording media and storage media managed by application stores distributing applications or by websites, servers, and the like supplying or distributing other various types of software.

In the specification, the term "unit" or "module" may be a hardware component such as a processor or circuit and/or a software component that is executed by a hardware component such as a processor. For example, the "unit" or "module" may be implemented by components, such as software components, object-oriented software components, class components, and task components, processes, functions, attributes, procedures, subroutines, segments of program code, drivers, firmware, micro codes, circuits, data, a database, data structures, tables, arrays, and variables.

The above description of the present disclosure is provided for illustration, and it will be understood by one of ordinary skill in the art that various changes in form and details may be readily made therein without departing from essential features and the scope of the present disclosure as defined by the following claims. Accordingly, the above embodiments of the present disclosure are examples only in all aspects and are not limited. For example, each component described as a single type may be implemented in a distributed manner, and similarly, components described as distributed may be implemented in a combined form.

According to the present disclosure, a bi-directional CAN communication system of multiple devices may be provided. According to the present disclosure, a communication system may be provided that is capable of bi-directional CAN communication even in a communication failure state by adding a minimum configuration may be provided. However, the scope of the present disclosure is not limited by this effect.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope of the present disclosure as defined by the following claims.

One or more embodiments may include a bi-directional controller area network (CAN) communication system of multiple devices, for example, a main device and multiple sub-devices.

However, the embodiments are examples, and do not limit the scope of the present disclosure.

Additional aspects may be set forth in the present disclosure and, in part, will be apparent from the description, or may be learned by practice of the presented embodiments.

According to one or more embodiments, a communication system may be provided for a plurality of sub-devices from a first sub-device to an $n^{th}$ sub-device, which sub-devices may be connected to a main device through a communication line, includes may include a switch provided at each of both ends of the main device and the plurality of sub-devices to open and close the communication line, a termination resistor and a termination switch provided at each of both ends of the main device and the plurality of sub-devices to form one termination end of the communication line when the switch is opened, a first communication line sequentially connecting the main device to each of the plurality of sub-devices from the first sub-device to the $n^{th}$ sub-device, a second communication line directly connecting one end of the main device to one end of the $n^{th}$ sub-device, and a processor electrically connected to the switch and the termination switch to control opening/closing operations of the switch and the termination switch.

The first communication line may directly connect the other end of the main device to one end of the first sub-device, and directly connect the other end of the first sub-device to one end of the second sub-device.

The processor may be configured to, in a normal communication state with no failure in the communication line, open a switch provided at one end of the main device connected to the $n^{th}$ sub-device through the second communication line, and close a termination switch provided at one end of the main device.

The processor may be configured to, in a normal communication state with no failure in the communication line, open a switch provided at one end of the $n^{th}$ sub-device connected to the main device through the second communication line, and close a termination switch provided at one end of the $n^{th}$ sub-device.

The processor may be configured to, in a communication failure state with a failure in the communication line, open a switch at one end connected to a $(k+1)^{th}$ sub-device, provided in a $k^{th}$ sub-device that is a last sub-device sequentially from the main device from among sub-devices in a normal communication state, and close a termination switch at one end connected to the $(k+1)^{th}$ sub-device, provided in the $k^{th}$ sub-device.

The processor may be configured to, in the communication failure state with the failure in the communication line, close a switch provided at one end of the main device connected to the $n^{th}$ sub-device through the second communication line and open a termination switch provided at one end of the main device.

The processor may be configured to, in the communication failure state with the failure in the communication line, close a switch provided at one end of the $n^{th}$ sub-device connected to the main device through the second communication line and open a termination switch provided at one end of the $n^{th}$ sub-device.

The processor may be configured to, in the communication failure state with the failure in the communication line, based on data not being received from the $k^{th}$ sub-device to the $(k+1)^{th}$ sub-device, open a switch at one end connected to the $k^{th}$ sub-device, provided in the $(k+1)^{th}$ sub-device, and close a termination switch at one end connected to the $k^{th}$ sub-device, provided in the $(k+1)^{th}$ sub-device.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A communication system for a plurality of sub-devices from a first sub-device to an $n^{th}$ sub-device, which are connected to a main device through a communication line, the communication system comprising:

a switch provided at each of both ends of the main device and the plurality of sub-devices to open and close the communication line;
a termination resistor and a termination switch provided at each of both ends of the main device and at each of the plurality of sub-devices to form one termination end of the communication line when the switch is opened;
a first communication line sequentially connecting the main device to each of the plurality of sub-devices from the first sub-device to the $n^{th}$ sub-device;
a second communication line directly connecting one end of the main device to one end of the $n^{th}$ sub-device; and
a processor electrically connected to the switch and the termination switch and configured to control opening and closing operations of the switch and the termination switch.

2. The communication system as claimed in claim 1, wherein the first communication line directly connects the other end of the main device to one end of the first sub-device, and directly connects the other end of the first sub-device to one end of the second sub-device.

3. The communication system as claimed in claim 1, wherein the processor is further configured to, in a normal communication state with no failure in the communication line, open a switch provided at the one end of the main device connected to the $n^{th}$ sub-device through the second communication line, and close a termination switch provided at the one end of the main device.

4. The communication system as claimed in claim 3, wherein the processor is further configured to, in a normal communication state with no failure in the communication line, open a switch provided at one end of the $n^{th}$ sub-device connected to the main device through the second communication line, and close a termination switch provided at one end of the $n^{th}$ sub-device.

5. The communication system as claimed in claim 1, wherein the processor is further configured to, in a communication failure state with a failure in the communication line, open a switch at one end connected to a $(k+1)^{th}$ sub-device, provided in a $k^{th}$ sub-device that is a last sub-device sequentially from the main device from among sub-devices in a normal communication state, and close a termination switch at one end connected to the $(k+1)^{th}$ sub-device, provided in the $k^{th}$ sub-device.

6. The communication system as claimed in claim 5, wherein the processor is further configured to, in the communication failure state with the failure in the communication line, close a switch provided at the one end of the main device connected to the $n^{th}$ sub-device through the second communication line and open a termination switch provided at the one end of the main device.

7. The communication system as claimed in claim 6, wherein the processor is further configured to, in the communication failure state with the failure in the communication line, close a switch provided at one end of the $n^{th}$ sub-device connected to the main device through the second communication line and open a termination switch provided at one end of the $n^{th}$ sub-device.

8. The communication system as claimed in claim 5, wherein the processor is further configured to, in the communication failure state with the failure in the communication line, based on data not being received from the $k^{th}$ sub-device to the $(k+1)^{th}$ sub-device, open a switch at one end connected to the $k^{th}$ sub-device, provided in the $(k+1)^{th}$ sub-device, and close a termination switch at one end connected to the $k^{th}$ sub-device, provided in the $(k+1)^{th}$ sub-device.

9. A method of communication for a plurality of sub-devices from a first sub-device to an $n^{th}$ sub-device, which are connected to a main device through a communication line, the method comprising:
providing a communication system, the communication system comprising a switch at each of both ends of the main device and at each of the plurality of sub-devices;
opening and closing a first communication line between the main device and the plurality of sub-devices using the communication system;
forming one termination end of the first communication line by opening the switch, wherein the communication system further comprises, at each of both ends of the main device and the plurality of sub-devices, a termination resistor and a termination switch;
sequentially connecting the main device to each of the plurality of sub-devices to form the first communication line;
directly connecting one end of the main device to one end of the $n^{th}$ sub-device to form a second communication line; and
controlling, by a processor electrically connected to the switch and the termination switch, opening and closing operations of the switch and the termination switch.

10. The method as claimed in claim 9, wherein the sequentially connecting comprises directly connecting the other end of the main device to one end of the first sub-device, and directly connecting the other end of the first sub-device to one end of the second sub-device.

11. The method of communication as claimed in claim 9, wherein, in a normal communication state with no failure in the communication line, opening, by the processor, a switch provided at the one end of the main device connected to the $n^{th}$ sub-device through the second communication line, and closing, by the processor, a termination switch provided at the one end of the main device.

12. The method of communication as claimed in claim 11, wherein, in a normal communication state with no failure in the communication line, opening, by the processor, a switch provided at one end of the $n^{th}$ sub-device connected to the main device through the second communication line, and closing, by the processor, a termination switch provided at one end of the $n^{th}$ sub-device.

13. The method of communication as claimed in claim 9, wherein, in a communication failure state with a failure in the communication line, opening, by the processor, a switch at one end connected to a $(k+1)^{th}$ sub-device, provided in a $k^{th}$ sub-device that is a last sub-device sequentially from the main device from among sub-devices in a normal communication state, and closing, by the processor, a termination switch at one end connected to the $(k+1)^{th}$ sub-device, provided in the $k^{th}$ sub-device.

14. The method of communication as claimed in claim 13, wherein, in the communication failure state with the failure in the communication line, closing, by the processor, a switch provided at the one end of the main device connected to the $n^{th}$ sub-device through the second communication line and opening, by the processor, a termination switch provided at the one end of the main device.

15. The method of communication as claimed in claim 14, wherein, in the communication failure state with the failure in the communication line, closing, by the processor, a switch provided at one end of the $n^{th}$ sub-device connected to the main device through the second communication line and opening, by the processor, a termination switch provided at one end of the $n^{th}$ sub-device.

16. The method of communication as claimed in claim 13, wherein, in the communication failure state with the failure in the communication line, based on data not being received by the $(k+1)^{th}$ sub-device from the $k^{th}$ sub-device, opening, by the processor, a switch at one end connected to the $k^{th}$ sub-device, provided in the $(k+1)^{th}$ sub-device, and closing, by the processor, a termination switch at one end connected to the $k^{th}$ sub-device, provided in the $(k+1)^{th}$ sub-device.

\* \* \* \* \*